United States Patent
Albertsen et al.

(10) Patent No.: US 6,721,164 B1
(45) Date of Patent: Apr. 13, 2004

(54) ELECTRONIC COMPOSITE MATERIAL COMPONENT

(75) Inventors: Knuth Albertsen, Aachen (DE); Wilhelm-Albert Groen, Limbricht (NL); Tilman Schlenker, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/807,687

(22) PCT Filed: Aug. 16, 2000

(86) PCT No.: PCT/EP00/08053
§ 371 (c)(1),
(2), (4) Date: Apr. 16, 2001

(87) PCT Pub. No.: WO01/15182
PCT Pub. Date: Mar. 1, 2001

(30) Foreign Application Priority Data

Aug. 20, 1999 (DE) .......................... 199 39 483

(51) Int. Cl.$^7$ ................................ H01G 4/06
(52) U.S. Cl. .................. 361/311; 361/312; 361/313; 361/321.1; 361/321.5; 501/139; 501/140
(58) Field of Search .............................. 361/311, 301.4, 361/306.3, 305, 313, 321.2, 306.1, 312, 321.5, 315, 321, 321.1, 321.3, 321.4, 322; 501/137, 139, 140, 134

(56) References Cited

U.S. PATENT DOCUMENTS

| 4,994,783 A | * | 2/1991 | Yaniger ....................... 338/308 |
| 5,258,886 A | * | 11/1993 | Murayama et al. ...... 361/321.5 |
| 5,448,209 A | * | 9/1995 | Hirai et al. .................. 333/204 |
| 5,870,274 A | * | 2/1999 | Lucas .......................... 361/311 |
| 5,889,647 A | * | 3/1999 | Hansen et al. .............. 361/311 |
| 6,078,494 A | * | 6/2000 | Hansen ..................... 361/321.5 |
| 6,212,057 B1 | * | 4/2001 | Kohara et al. ........... 361/301.4 |
| 6,288,890 B1 | * | 9/2001 | Saito et al. ................. 361/523 |

FOREIGN PATENT DOCUMENTS

JP   63-086309   *  4/1988

* cited by examiner

Primary Examiner—Dean A. Reichard
Assistant Examiner—Nguyen T. Ha

(57) ABSTRACT

The invention describes an electronic component, in particular a multiplayer component, with a dielectric and at least one electrode. The dielectric is a composite made of a dielectric ceramic material and an organic polymer. To manufacture the electronic component, the dielectric ceramic material is mixed with a suitable monomer, the mass id formed, and the monomer is polymerized. Ceramic bodies of stable shape are obtained which can be processed further into capacitors, antennas, or other passive components in that electrodes are provided. Sintering of the electronic components is no longer necessary.

15 Claims, No Drawings

ELECTRONIC COMPOSITE MATERIAL COMPONENT

The invention relates to a passive component, in particular a multilayer component, comprising a dielectric and at least one electrode.

Many components having a multilayer structure are manufactured in the electronics industry. Among them are, for example, multilayer capacitors, antennas, actuators, and varistors. Multilayer capacitors are manufactured in the greatest quantities.

Ceramic multilayer components are usually manufactured in that green ceramic substrate foils alternating with layers of a metal paste for the inner electrodes are stacked on components, which are usually dielectric, whereupon the stack of ceramic and metal layers is sintered.

The quality of a multilayer component is determined both by the chemical composition of the materials used for the dielectric and for the electrodes and by the manufacturing conditions. It is first and foremost the sintering conditions which play a part in the manufacturing conditions. Various, mutually opposed oxidation and reduction reactions may take place during sintering in dependence on the sintering atmosphere. Thus, for example, barium titanate and its derivatives becomes semiconducting during sintering in a reducing atmosphere. They are unsuitable as dielectrics in this state. Sintering of the multilayer capacitors under oxidizing conditions can take place only if the electrode material consists of rhodium, palladium, or platinum. Rhodium and platinum, however, are very expensive, their cost price may account for up to 50% of the total. The development rather tends towards the use of the much cheaper metals such as Ni, Cu, Ag, or alloys thereof instead of rhodium and platinum. These metals, however, oxidize when sintered under oxidizing conditions.

There is a particular demand for ceramic materials which can be used in combination with cheaper metals, such as nickel, copper, or silver, as temperature-stable NP0 materials, which are widely used in the field of telecommunication. The use of silver electrodes is especially attractive because the internal resistance has an increasing influence at the frequencies of above 500 MHz used in telecommunication because of the so-called skin effect. It is only electrodes of copper, silver, gold, and aluminum which have sufficiently low values for the internal resistance which render possible a use at higher frequencies. Capacitors with low, but accurate capacitance values are particularly interesting for these applications.

A reduction of the sintering temperature to below 900° C., which renders possible the use of silver electrodes, is problematic because the dielectric materials with high melting points are to be sintered with highly reactive glasses or other compounds of low melting points. This in its turn may lead to reactions between the various phases, which will then change the temperature specification of the dielectric materials used.

The invention has for its object to provide an electronic component, in particular a multilayer component, which can be inexpensively manufactured.

This object is achieved by means of an electronic component with a dielectric and at least two electrodes, characterized in that the dielectric comprises a composite consisting of a dielectric ceramic material and an organic polymer.

Usually, passive ceramic components are sintered for strengthening the dielectric. This leads to a shrinkage, i.e. a density increase in the dielectric which will be very different in dependence on the nature of the material, the particle size distribution of the basic powder, and the reaction conditions (sintering temperature, sintering time, sintering atmosphere). In the component according to the invention, the strengthening of the dielectric is achieved by means of a polymer. The dielectric ceramic material is for this purpose first mixed with the monomer of a suitable polymer, whereupon the monomer is polymerized. Sintering is rendered unnecessary thereby.

Preferably, the organic polymer is insoluble in water.

The use of a water-insoluble polymer prevents changes in the properties and shape of the passive component and/or the dielectric which could be caused by the penetration of moisture.

It is furthermore preferred that the polymer comprises a polyimide, polyethylene, polycarbonate, or polyurethane.

These polymers wet the dielectric ceramic material and are all insoluble in water.

It may be preferred that the dielectric ceramic material has a low temperature coefficient.

Electronic components, in particular capacitors and antennas, whose dielectric has a low temperature coefficient are widely used in the field of telecommunications. The temperature specification of the dielectric is not changed because of the low temperatures in the manufacture of the passive component.

It is particularly favorable when the electrodes comprise Ag, Au, Cu, Al, or alloys of these metals.

Since sintering at high temperatures is not necessary, inexpensive metals which would be oxidized under the usual sintering conditions can be used as the electrode material. In addition, these metals have a low effective series resistance.

It is preferred that the electronic component is chosen from the group comprising capacitors, antennas, actuators, and varistors.

The invention further relates to a method of manufacturing an electronic component with a dielectric and at least two electrodes, in which method the dielectric ceramic material and a monomer of a polymer are mixed together,
the mass obtained is formed,
the monomer is partly or completely polymerized, and
the electrodes are provided.

It may be preferred that a second polymerization step is carried out after the electrodes have been provided.

A typical manufacturing process for a multilayer component with printed metal layers comprises the following steps:

1. manufacture of a suspension from a ceramic powder, a solvent, a dispersing agent, a binder, a liquefier, etc.,
2. drawing out of the suspension into layers,
3. drying of the layers so as to obtain green ceramic foils,
4. printing of the green ceramic foils with a structured metal layer,
5. stacking of the foils,
6. laminating the stack,
7. separating into individual green products,
8. driving out of the binder by heating,
9. sintering,
10. providing the external contact paste and baking of the outer contacts.

The method according to the invention renders most of the above steps, in particular the sintering step, of this manufacturing process unnecessary. Not only does this simplify and shorten the method, it also reduces the cost.

It is preferred in all embodiments that the polymerization is thermally initiated.

The polymerization of the monomer is thermally initiated by means of temperatures below 400° C. These low temperatures during manufacture on the one hand lead to a product of stable shape, while on the other hand the manufacturing cost and the $CO_2$ emission are reduced.

It is furthermore preferred that the quantity m of monomer used lies between 3% by weight $\leq m \leq 20\%$ by weight in relation to the quantity of dielectric ceramic material used.

The dielectric constant $\epsilon$ can be adjusted to a desired value by means of the mixing ratio of dielectric ceramic material and polymer in the composite material.

The invention also relates to a dielectric ceramic compound which comprises a composite of a dielectric ceramic material and an organic polymer.

A passive component of stable shape which is not limited to a planar geometry, such as, for example, a dielectric rod antenna, may be formed with the use of a dielectric ceramic compound which comprises a composite of a dielectric ceramic material and an organic polymer, and by means of the manufacturing method according to the invention.

The invention further relates to a filter arrangement with an electronic component which comprises a dielectric and at least two electrodes, wherein the dielectric comprises a composite of a dielectric ceramic material and an organic polymer.

The invention will now be explained in more detail below with reference to three embodiments.

To manufacture an electronic component according to the invention, a dielectric ceramic material is mixed with a monomer of an organic polymer which is insoluble in water. Mixing takes place preferably in an organic solvent such as, for example, a hydrocarbon, an aromatic hydrocarbon, THF, N-methylpyrrolidone, or γ-butyrolactone. The dielectric ceramic material used may be, for example, a ferroelectric material such as barium titanate, lead-zirconium-titanium oxide, or, for example, an NP0 material such as a substituted barium-neodymium-titanium perowslite with a defective structure, $(Mg,Ca)TiO_3$, $BaZrO_3$, $BaTi_4O_9$, $Ca(Zr,Ti)O_3$, or $BaO-Sm_2O_3-5TiO_2$. The monomers used may be, for example, the monomers of a polyimide, a polyethylene, a polycarbonate, or a polyurethane. The quantity m of monomer used lies between 3 and 20% by weight in relation to the quantity of dielectric ceramic material used. After the milled dielectric ceramic material has been mixed with the monomer of one of the polymers in an organic solvent, the solvent is removed. The resulting powder is granulated in that it is pressed through a sieve with a mesh of 300 μm, and is subsequently processed in a granulating drum into a tumbled granulate. The granulate is then molded into the desired shape under pressure. These molded products are then exposed to temperatures of up to 400° C. for the thermal initialization of the polymerization of the monomers. The polymerization may take place partly or fully at this stage. Then the electrodes are fastened, for example by means of a vapor deposition process, electroless plating, silk-screen printing, electroplating, or transfer printing. The electrodes may comprise, for example, Ag, Au, Cu, Al, or alloys of these metals.

Several of such only partly polymerized forms may be stacked one on the other and subjected to a second thermally initiated polymerization step for the manufacture of multilayer components.

Alternatively, metal strips or plates may be compressed together with the granulate in the manufacture of multilayer components. Internal electrodes are thus manufactured during the polymerization.

The electronic components manufactured may be, for example, capacitors, antennas, actuators, or varistors. One or several such electronic components may be used in a filter arrangement.

Embodiments of the invention will now be explained below, representing examples of how the invention may be realized.

EMBODIMENT 1

To manufacture a disc capacitor, 5 g of the substituted barium-neodymium-titanium perowskite with a defective structure (# corresponds to a cation void) $\{Ba_{0.242}Sr_{0.02}Ca_{0.03}Nd_{0.232}Gd_{0.23}\#_{0.246}\}[Ti_{0.97}Nb_{0.03}]O_3$ is mixed with 16.5 mg of a 1:1 mixture of pyromellithic acid dianhydride and 4,4'-diaminodiphenylether in N-methylpyrrolidone. The solvent is subsequently evaporated. The powder thus obtained is pressed through a sieve of 300 μm mesh and is subsequently processed into a tumbled granulate in a granulating drum. The granulate is then molded into a disc with a diameter of 6 mm and a thickness of 500 μm under a pressure of 400 MPa The disc is exposed to a temperature of 380° C. in a nitrogen atmosphere. Then Au electrodes are provided on the disc by means of chemical vapor deposition (CVD).

EMBODIMENT 2

A disc capacitor is manufactured in the same manner as in embodiment 1. However, 26.5 mg of the mixture of pyromellithic acid dianhydride and 4,4'-diaminodiphenylether is used here.

EMBODIMENT 3

A disc capacitor is manufactured in the same manner as in embodiment 1. However, 50.1 mg of the mixture of pyromellithic acid dianhydride and 4,4'-diaminodiphenylether is used here.

All disc capacitors had a dielectric constant $\epsilon$ above 20, the two disc capacitors with 3.3 and 5.3% by weight of polyimide monomer even had a dielectric constant $\epsilon$ above 25. In addition, all disc capacitors showed an NP0 characteristic. The insulation resistance was above $3 \cdot 10^{11}$ Ωm in all cases.

EMBODIMENT 4

For the manufacture of a dielectric antenna, 5 g of the substituted barium-neodymium-titanium perovskite with a defective structure: $\{Ba_{0.242}Sr_{0.02}Ca_{0.03}Nd_{0.232}Gd_{0.23}\#_{0.446}\}[Ti_{0.97}Nb_{0.03}]O_3$ (in which # denotes a cation void) was mixed with 50.1 mg of a 1:1 mixture of pyromellithic acid dianhydride and 4,4'-diaminodiphenylether in N-methylpyrrolidone. The solvent was then evaporated. The resulting powder was pressed through a sieve of 300 μm mesh and subsequently processed into a rolling granulate in a granulating drum. The granulate was then processed into a cuboid of 2×10×16 mm³ under a pressure of 400 MPa. The cuboid was subjected to a temperature of 380° C. in a nitrogen atmosphere. Then a Cu electrode covering four sides of the cuboid was vapor-deposited on a Ni/Cr adhesion layer an electrochemically reinforced to a thickness of 15 μm.

The antenna showed a resonance frequency of 900 mhz, an adaptation at the resonance of −30 db, and an efficiency of 80%.

What is claimed is:

1. A method of manufacturing an electronic component with a dielectric and at least one electrode, which method is characterized in that a powder of a dielectric ceramic material and a monomer of a polymer are mixed together, to form a mass, the monomer is partly or completely polymerized, and the electrodes are provided.

2. A method of manufacturing of an electronic component with a dielectric and at least one electrode, the dielectric comprising a composite consisting of a powder of a dielectric ceramic material and an organic polymer, characterized in that the electronic component is produced in accordance with the method of claim 1.

3. A method of manufacturing of an electronic component as claimed in claim 2, characterized in that the organic polymer is insoluble in water.

4. A method of manufacturing of an electronic component as claimed in claim 2, characterized in that the polymer comprises a polyimide, polyethylene, polycarbonate, or polyurethane.

5. A method of manufacturing of an electronic component as claimed in claim 2, characterized in that the dielectric ceramic material has a low temperature coefficient.

6. A method of manufacturing of an electronic component as claimed in claim 2, characterized in that the electrodes comprise Ag, Au, Cu, Al, or alloys of these metals.

7. A method of manufacturing of an electronic component as claimed in claim 2, characterized in that the electronic component is chosen from the group comprising capacitors, antennas, actuators, and varistors.

8. A method as claimed in claim 1, characterized in that a second polymerization step is carried out after the electrodes have been provided.

9. A method as claimed in claims 1 and 8, characterized in that the polymerization is thermally initiated.

10. A method as claimed in claims 1 and 8, characterized in that the quantity m of monomer used lies between 3% by weight $\leq m \leq 20\%$ by weight in relation to the quantity of dielectric ceramic material used.

11. A method as claimed in claim 2, characterized in that the quantity m of monomer used lies between 3% by weight $\leq m \leq 20\%$ by weight in relation to the quantity of dielectric ceramic material used.

12. A dielectric compound, the dielectric compound comprising a composite of a powder of a dielectric ceramic material and an organic polymer, characterized in that the dielectric compound is manufactured by the method comprising the steps of (a) mixing a powder of a dielectric ceramic material together with a monomer of a polymer to form a mass; (b) forming the mass; and (c) partly or completely polymerizing the monomer in the formed mass.

13. A method as claimed in claim 12, characterized in that the quantity m of monomer used lies between 3% by weight $\leq m \leq 20\%$ by weight in relation to the quantity of dielectric ceramic material used.

14. A filter arrangement with an electronic component which comprises a dielectric compound and at least two electrodes, the dielectric compound comprising a composite of a powder of a dielectric ceramic material and an organic polymer, characterized in that the dielectric compound is manufactured by the method comprising the steps of (a) mixing a powder of a dielectric ceramic material together with a monomer of a polymer to form a mass; (b) forming the mass; and (c) partly or completely polymerizing the monomer in the formed mass.

15. A method as claimed in claim 14, characterized in that the quantity m of monomer used lies between 3% by weight $\leq m \leq 20\%$ by weight in relation to the quantity of dielectric ceramic material used.

* * * * *